United States Patent [19]

Lambert et al.

[11] 4,450,401
[45] May 22, 1984

[54] CONTROL CIRCUIT FOR AUTOMATIC BATTERY CHARGERS

[75] Inventors: Frederic J. Lambert, Morrisville, Pa.; Donald J. Bosack, Barrington; David K. Johansen, Lake in the Hills, both of Ill.

[73] Assignee: GNB Batteries Inc., Mendota Heights, Minn.

[21] Appl. No.: 396,951

[22] Filed: Jul. 9, 1982

[51] Int. Cl.$^3$ .............................................. H02J 7/00
[52] U.S. Cl. ..................................... 320/22; 320/32; 320/37
[58] Field of Search ...................... 320/20, 21, 22, 30, 320/31, 32, 37, 38, 48

[56] References Cited

U.S. PATENT DOCUMENTS

| | | | |
|---|---|---|---|
| 3,500,167 | 3/1970 | Applegate et al. | 320/14 |
| 3,794,905 | 2/1974 | Long | 320/20 |
| 3,855,516 | 12/1974 | Fairchild | 320/22 |
| 3,864,617 | 2/1975 | Smith et al. | 320/32 |
| 3,912,108 | 10/1975 | Clayton et al. | 320/39 |
| 3,979,658 | 9/1976 | Foster | 320/23 |
| 4,097,792 | 6/1978 | Calaway | 320/22 |
| 4,131,841 | 12/1978 | Bennefeld | 320/23 |
| 4,146,830 | 3/1979 | Foster | 320/23 |
| 4,191,918 | 3/1980 | Nicholls | 320/23 |
| 4,207,513 | 6/1980 | Hess, Jr. | 320/23 |
| 4,209,736 | 6/1980 | Reidenbach | 320/22 |
| 4,213,080 | 7/1980 | Rock | 320/37 |
| 4,217,533 | 8/1980 | Van Beek | 320/23 |
| 4,233,553 | 11/1980 | Prince, Jr. et al. | 320/23 |
| 4,313,078 | 1/1982 | Bilsky | 320/15 |

*Primary Examiner*—William M. Shoop
*Assistant Examiner*—Anita M. Ault
*Attorney, Agent, or Firm*—Augustus J. Hipp

[57] ABSTRACT

An improved battery charger apparatus having a control circuit providing different charging periods which are automatically correlated with the type of battery connected to the charge for charging the connected battery to a preselected full charge state. The apparatus has a charging circuit for charging the battery, a sensing circuit for sensing the state of the battery during charging thereof by the charging circuit and a circuit for determining first and second predetermined reference voltage/current states.

The apparatus causes the charging of the battery at a preselected initial charging level for an initial time period and establishes a first finish time period. The apparatus further determines a first time at which the state of the battery reaches the first predetermined referenced voltage/current state during the initial time period, and causes the charging circuit to continue to charge the battery at a preselected first charging level after the determination of the first time for a first finish time period. The apparatus further establishes a second finish time period and determines a second time at which the state of the battery reaches the second predetermined referenced voltage/current state during the first finish time period. The apparatus terminates charging of the battery if the state of the battery does not reach the second predetermined referenced voltage/current state during the first finish time period, and causes the charging circuit to continue to charge the battery at a preselected second charging level after the determination of the second time for a second finish time period.

8 Claims, 1 Drawing Figure

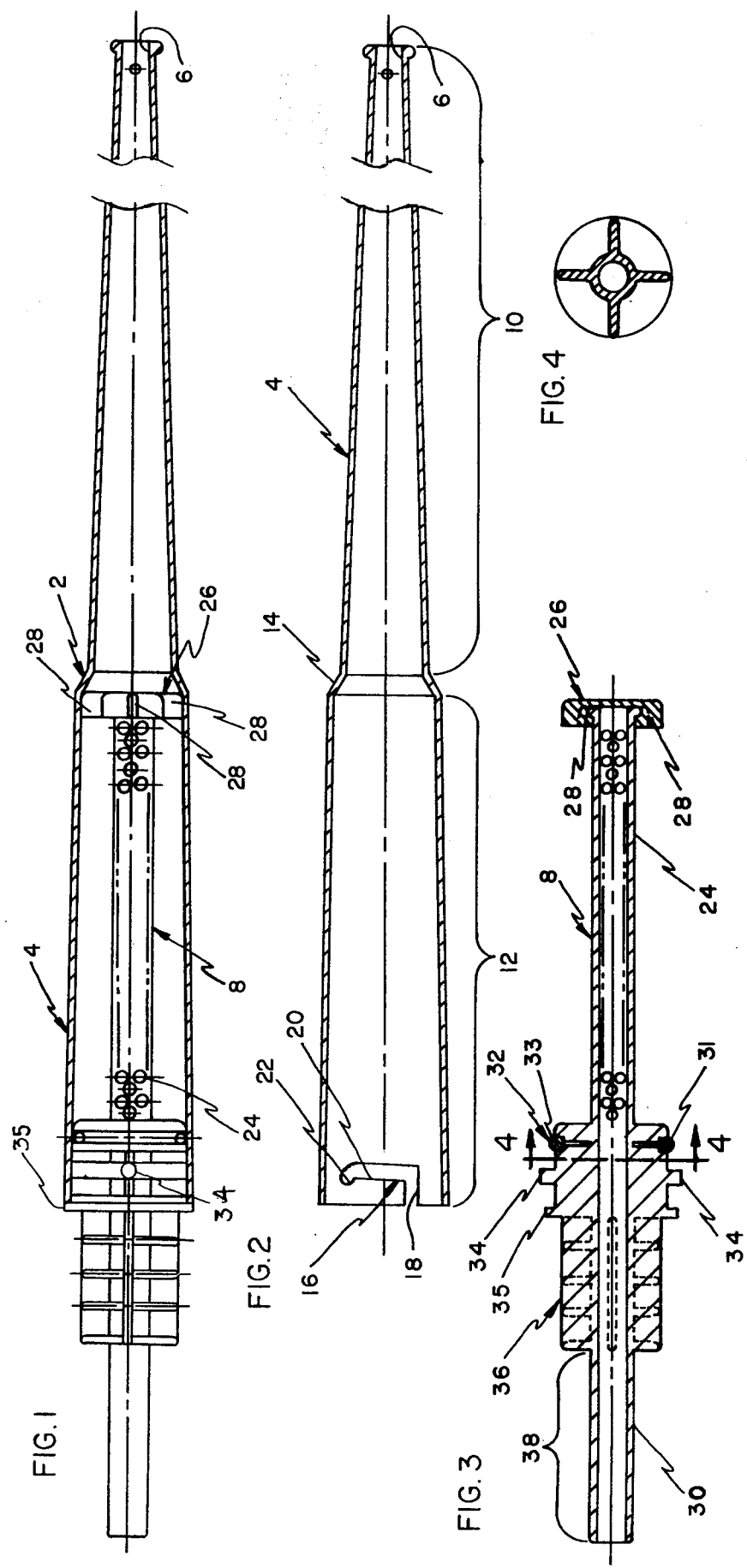

CONTROL CIRCUIT FOR AUTOMATIC BATTERY CHARGERS

DESCRIPTION

TECHNICAL FIELD

This invention relates to battery chargers and in particular to means for providing automatic controlled recharging of different types of motive power batteries and the like.

DESCRIPTION OF THE BACKGROUND ART

It has been conventional to effect recharging of motive power batteries by controlling the charge time through a motor-driven timer. In one use of such a timer, the duration of the charging cycle has been caused to be equal to the time set on the timer by the user.

Numerous different types of batteries are known. For example those typically used in trucks are either a low-maintenance type battery or a conventional type battery with antimonial grids. Conventional battery chargers have different manual settings for different types of batteries and typically battery chargers are usually dedicated to a certain type battery. There has been a need for an automatic battery charger which can distinguish between different types of batteries so that a user will not mistakenly apply a wrong charging level and time to a battery. Until the present invention the prior art method of accurately charging batteries required the installation of expensive and fragile ampere-hour integrators on trucks in order to determine the depth of discharge of the battery. Few trucks are equipped with ampere-hour integrators and therefore the only other way of determining the depth of discharge is to estimate it from a measurement of the specific gravity of electrolyte. This method is not accurate because the depth of discharge for a specific gravity is not a constant for all batteries, and is also temperature dependent.

Once the depth of discharge has been determined, the battery charger timer must be set so that the charging cycle will be terminated when the battery is fully charged. The setting is based on depth of discharge, type of battery, temperature, age and condition of battery.

The last step is to set the battery charger output voltage and current control to charge either a low counter-voltage battery or a high counter-voltage battery. Typically conventional batteries have a low counter-voltage, and low maintenance batteries have a high counter-voltage.

The technical expertise required to make the necessary measurements and decisions is not always available to the majority of battery users. Therefore, typical industrial truck battery chargers are designed to overcharge the battery to make certain it always receives a least a full charge. The overcharge reduces battery life, increases water loss in the electrolyte and wastes electrical energy.

One battery charger control circuit for use in automatic battery chargers is illustrated in U.S. Pat. No. 4,131,841, which discloses an improved battery charger having a current limiting transformer for supplying a charging current. The transformer includes primary and secondary coils wound about a core and has a shunt path for a portion of the magnetic flux induced by the voltage appearing on the primary. A pair of silicon controlled rectifiers are alternately triggered into their forward conductive states at points relatively early in each alternating current half cycle to provide a maximum charging current when a substantially discharged battery is to be recharged. As the charging process progresses, the battery voltage increases and at a predetermined value of the battery voltage a smooth transition from the current-controlled mode to a voltage-controlled mode has been completed, the SCRs are triggered into conduction much later in each cycle, thereby furnishing a very low or trickle current which can be continued indefinitely without damage to the battery. Simple adjustments are provided for determining the maximum voltage at which the changeover is to begin.

U.S. Pat. No. 4,233,553 discloses an automatic dual mode battery charger wherein a voltage regulating means provides two modes of operation. A current detector connected in series with the voltage regulator and the battery provides a means for detecting current flow through the battery and controls the operation of the voltage controller, to change the output of the voltage regulating means between the two modes of operation.

U.S. Pat. No. 4,217,533 relates to a device for charging batteries wherein the device provides a substantially constant charging current for a first charging interval until a voltage level which is less than that of a fully charged battery is reached. At this time, the device continues charging in a sequence of subsequent time intervals with charging currents which decrease at different rates in each interval until the battery is fully charged. The duration of each of the subsequent time intervals and the rates at which the charging currents decrease may be adjusted to shorten charging time while minimizing gasification of water in the battery.

U.S. Pat. No. 3,979,658 disclose an automatic electric battery charging apparatus of the taper type having means for comparing a reference signal with a control signal varying with battery voltage, and terminating the charge when the rate of rise of battery voltage falls below a predetermined value. To prevent spurious operation due to mains voltage variation, the control signal comprises the difference between a signal dependent on battery voltage and a signal dependent of a.c. supply voltage.

U.S. Pat. No. 4,313,078 relates to a battery charging system in which the ampere-hour discharge of the battery is sensed for controlling the battery charging rate. The battery is charged at a relatively high charge rate during a first time period proportional to the extent of battery discharge and at a second lower rate thereafter.

DISCLOSURE OF THE INVENTION

The present invention comprehends an improved motive power battery charger providing different charging periods which are automatically correlated with the type of battery connected to the charger. The batteries are charged to a preselected full charge state. The apparatus has charging means for charging the battery, sensing means for sensing the state of the battery during charging thereof by the charging means and first and second predetermined reference states.

An improved charge control circuit for use in the apparatus comprises a means for causing the charging means to charge the battery at a preselected initial charging level for an initial time period. Also, a means for establishing a first time period is provided and a first means for determining a first time at which the state of the battery reaches the first predetermined referenced state during the initial time period is provided. The control circuit further comprises a means for causing the charging means to continue to charge the battery at a preselected first charging level after the determination of the first time for a first finish time period. A means for establishing a second finish time period is provided and a second means for determining a second time at which the state of the battery reaches the second predetermined referenced state during the first finish time period is provided. The control circuit further includes means for terminating charging of the battery if the state of the battery does not reach the second predetermined referenced voltage/current state during the first finish time period, and means for causing the charging means to continue to charge the battery at a preselected second charging level after the determination of the second time for a second finish time period.

OBJECTS OF THE INVENTION

It is a general object of the present invention to provide an improved automatic charging apparatus for use with different types of batteries.

It is a further object of the present invention to provide an automatic battery charger for either a low-maintenance battery or a conventional battery with antimonial grids without making any adjustments to the battery charger.

It is another object of the present invention to eliminate operating controls from the battery charger so that the operator needs only connect the battery to the charger to obtain the optimum charge.

It is an additional object to limit the charge to the minimum required to return the battery to a fully charged state in order to maximize battery life and minimize maintenance and energy cost.

BRIEF DESCRIPTION OF THE DRAWINGS

Other features and advantages of the invention will be apparent in the following description taken in connection with the accompanying drawings wherein:

FIG. 1 is a schematic block diagram illustrating a portion of a battery charging apparatus embodying the invention.

BEST MODE FOR CARRYING OUT THE INVENTION

The present invention provides a novel control circuit for use in an automatic battery charger which is capable of charging either a low-maintenance type battery or an antimonial type battery. The low maintenance battery requires a higher charging voltage than the battery with antimonial grids. The time required for the charging current to decrease to a specific value between the starting and finish current is dependent on the initial state of charge of the battery. The minimum charging time to reach a full charge is dependent on the initial state of charge. Also the finish current to a low-maintenance battery will be lower than the finish current to an antimonial battery at the same charging voltage.

In general the present invention operates in the following sequence. First it energizes the charger when the battery is connected to the charger. Then a timing ciruit starts measuring time from when the battery charger is energized. Next the charging current is limited to a specific maximum current regardless of the initial state of charge of the battery, and decreases as the battery counter-voltage increases during the charge. When the charging current has decreased to a specific reference value, typically between 5 to 20 amperes per 100 ampere-hours of the charger rating, the charging voltage is automatically increased to a finish voltage that is appropriate for a conventional battery with antimonial grids. Its value will typically be approximately 2.50 volts per cell. The timing circuit is automatically reset to zero when the reference value is reached. If the charging current does not decrease to a second reference value, the timing circuit will terminate the charging cycle in a period of time that is dependent on the lapse time between the start of the charging cycle and the time when the current decrease to the first reference value. Typically the second reference level will be 2 to 3 amperes per 100 ampere-hours. The finish current to a conventional antimonial battery will not taper below 3 amperes per 100 ampere-hours. If the charging current decreases to the second reference level, the charging voltage will be automatically increased to a higher value such as 2.65 to 2.70 volts per cell, and the timing circuit will reset to zero. The charging cycle will be terminated in the length of time dependent on the lapse time to reach the second reference level.

FIG. 1 is a block diagram of a novel change control circuit for use in an automatic battery charger. A temperature stabilized voltage reference 10 is used in the circuit to provide accurate and repeatable operation. The referenced voltage is ranged by a calibration network 12 to the proper voltage level so that the comparator stages 14 and 16 will trip at the proper time. A shunt amplifier stage 18 is used to amplify and range a shunt signal from the battery to a level usable with the comparators 14 and 16. In the preferred embodiment the current provided to the battery is monitored to determine the reference state. It is to be understood however that the voltage across the battery could also be used as the signal or a functional combination of voltage and current, referred to as the voltage/current state, may be utilized as the reference state within the broad scope of the invention. The shunt amplifier stage 18 also filters the current signal so that the output DC voltage represents the average charging current.

When the battery is initially connected to the charging means, 18 amperes per 100 ampere-hours is applied to the battery at a level of 2.37 volts per cell. The first comparator stage 14 provides a true logic level output when the shunt amplifier signal becomes less than 10 amperes per 100 ampere-hours rating (a first predetermined reference state) and the second comparator stage 16 is ranged to provide a true logic level output when the shunt amplifier signal becomes less than 2 amperes per 100 ampere-hours rating (a second predetermined reference state). The comparators 14 and 16 do not have a hysteresis feedback loop because inaccuracies and other problems could occur during power outages and initial charger turn on delays. Delay stages 20 and 22 are provided which require the comparator stage output to be true for a specific period of time before propagating through to the next stage. In the preferred embodiment a delay of approximately half a second is utilized. Logic is necessary to inhibit these signals when there is a power outage or during the charger turn on delay time. This logic is shown as a comparator trip enable logic stage 24. Its output will be true when the operator is charging a battery and there is not a power outage. The output of the comparator trip enable logic 24 and the delay 20 and 22 are combined in AND gates 26 and 28. The output of the AND gates 26 and 28 will be true when the comparator has tripped, the delay time has elapsed, and the comparator trip enable logic state output is true. The true output signal from the AND gates 26 and 28 will be latched by logic circuits 30 and 32. Drivers 34 and 36 are provided to interface directly to the power stage regulation circuit or they may control an electromechanical relay coil that controls the power stage voltage limit.

When the 10 amps per 100 ampere-hours rating signal is latched, the variable timing logic stage 38 is switched from its initial time period to a finish time period. The finish time period is a function of the initial time period. The end of charge logic stage 40 will terminate the charge cycle based on signals from the variable timing logic stage 38, and possibly from the 2 amps per 100 ampere-hours rating latch. Driver 42 provides the output to the charging means and clock 44 provides a stable time base for the variable timing logic 38.

In the preferred embodiment the following components were utilized.

The voltage reference 10 is a Motorola MC1403U temperature stabilized 2.5 V voltage reference filtered with a 0.01 microfarad ceramic capacitor on its output. The calibration network 12 is a passive network consisting of temperature stable metal film ranging resistors and adjustment trimmer potentiometers which will adjust the 10 A/100 AH and 2 A/100 AH comparator trip point thresholds. The 10 A/100 AH and 2 A/100 AH comparators 14 and 16 are National Semiconductor LM393N dual voltage comparators connected in a conventional manner without hysteresis, comparing the calibrated reference voltage from the calibration network stage, to the ranged and filtered voltage signal from the shunt amplifier stage. The shunt amplifier 18 is an Intersil ICL7650 chopper stabilized operational amplifier connected to differentially amplify the voltage signal from the battery current shunt. The shunt amplifier gain is adjusted to provide approximately 1 V output when the battery current is 10 Amperes per 100 Ampere hours charger rating. The shunt amplifier output is also capacitively filtered to remove the full wave rectified frequency component from the output signal.

Delays 20 and 22 are Motorola MC14490FP Hex Contact Bounce Eliminator stages used to provide the propagation time delay of approximately 0.5 second required for circuit operation. Comparator trip enable logic 24 is CMOS digital logic which monitors many charger parameters (i.e. power outage logic, emergency off switch logic, power up delay logic, etc.) and enables the comparator stage outputs to be latched only when valid battery charging conditions are present. The AND gates 26 and 28 are conventional CMOS AND gate functions. The actual circuit uses Motorola MC14012BCP Quad NAND gates for this function. The latch logic circuits 30 and 32 are Motorola MC14044BCP Quad NAND R-S latch stages used in the circuit to latch the comparator stage trip signals. Drivers 34, 36 and 42 are CMOS drivers (Motorola MC14050BCP) used to drive RCA CA3086 transistor array stages which interfaced to the battery charger voltage regulation circuit, causing the required voltage boost functions to occur at the proper times.

Variable timing logic stage 38 is CMOS digital logic which monitors the charging time required to reach the 10 Amps/100 AH trip point and determines the optimum finish charge time from the previously monitored time period. End of charge logic stage 40 is CMOS digital logic which determines the proper time to shut the battery charging current off. The logic will extend the charge time if the 2 A/100 AH comparator is tripped at the end of the finish mode time determined by the variable timing logic. Clock 44 is a CMOS digital logic stage with passive components which condition the 60 Hz line frequency signal derived from a control transformer secondary which has a primary coil connected to the battery charger input line voltage. The clock stage provides a stable 60 HZ time base to the variable timing logic stage 38.

INDUSTRIAL APPLICABILITY

The invention is useful in a wide range of industrial battery recharging applications. The control provides an improved optimum recharging of different types of batteries so as to provide long troublefree life thereof.

The foregoing disclosure of specific embodiments is illustrative of the broad inventive concepts comprehended by the invention.

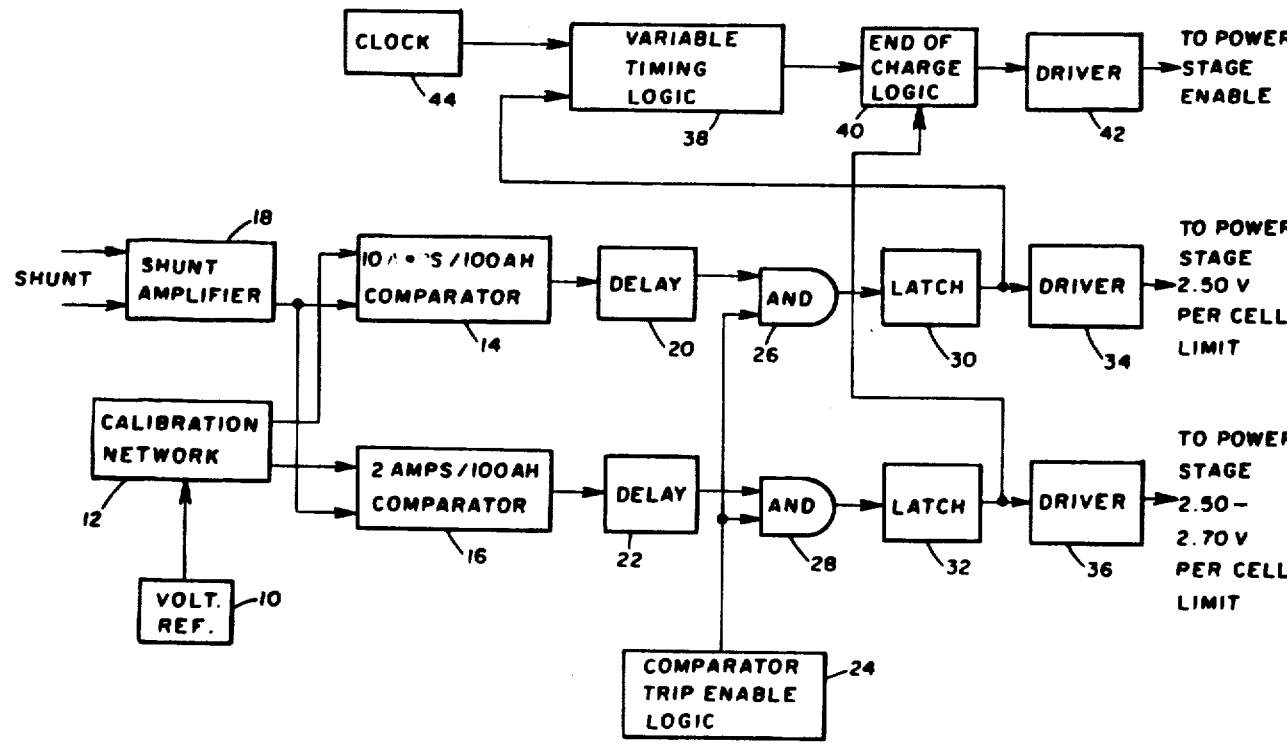

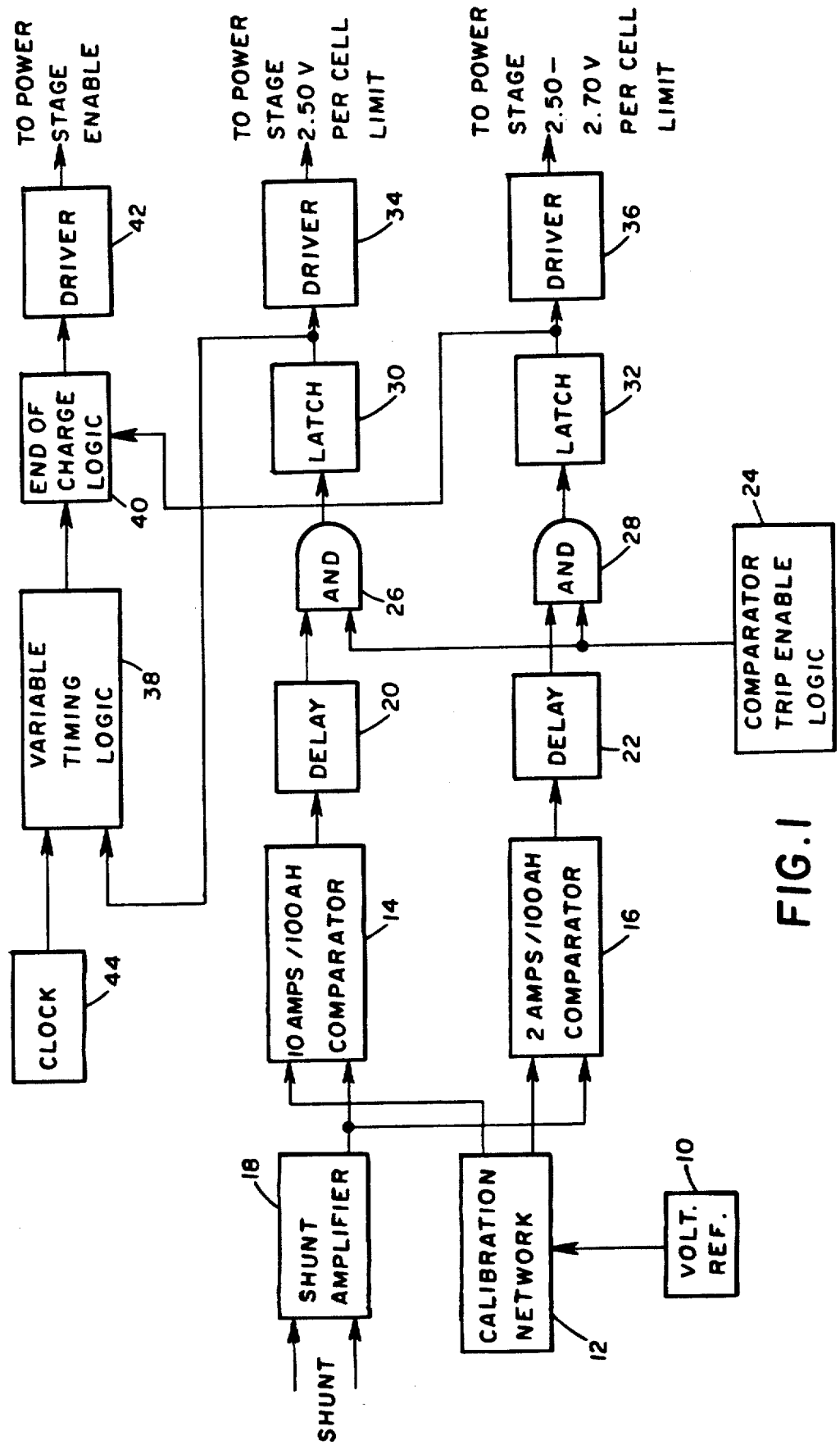

We claim:

1. In an apparatus for automatically charging different types of batteries to a preselected full charge state, the apparatus having charging means for charging the battery, sensing means for sensing the state of the battery during charging thereof by said charging means, and means for establishing first and second predetermined reference states, an improved charge control circuit comprising:

means for initiating operation of the charging means to charge the battery at a preselected initial charging level for an initial time period;

means for establishing a first finish time period;

first means for determining a first time at which the state of the battery reaches said first predetermined reference state during said initial time period;

means for causing the charging means to continue to charge the battery at a preselected first charging level after the determination of said first time;

means for establishing a second finish time period;

second means for determining a second time at which the state of the battery reaches said second predetermined reference state during said first finish time period;

means for terminating the charging of the battery if the state of the battery does not reach said second predetermined reference state during said first finish time period; and means for causing the charging means to continue to charge the battery at a preselected second charging level for a second finish time period in the event the battery reached said second predetermined reference state during said first finish time period.

2. The battery charging apparatus of claim 1 wherein said charge control circuit includes a counter for timing said initial time period and means for resetting said counter, said counter being reset by said resetting means as a result of the sensed battery state reaching said first predetermined reference state during said initial time period, and said counter also being reset by said resetting means as a result of a sensed battery state reaching said second predetermined reference state during said first finish time period.

3. The battery charging apparatus of claim 1 wherein said charge control circuit includes first and second comparators for determining the first and second times when the state of the battery reaches said first and second predetermined reference states, respectively.

4. The battery charging apparatus of claim 1 wherein said charge control circuit includes a plurality of bistable elements, a counter, and means for resetting said counter, said bistable elements and counter cooperatively comprising said means for establishing said first finish time period and said second finish time period.

5. In an apparatus for automatically charging different types of batteries to a preselected full charge state, the apparatus having charging means for charging the battery, sensing means for sensing the current provided to the battery during charging thereof by said charging means, and first and second predetermined reference current state, an improved charge control circuit comprising:
   means for initiating operation of the charging means to charge the battery at a preselected initial charging level for an initial time period;
   means for establishing a first finish time period;
   first means for determining a first time at which the current state provided to the battery reaches said first predetermined current state during said initial time period;
   means for causing the charging means to continue to charge the battery at a preselected first charging level after the determination of said first time;
   means for establishing a second finish time period;
   second means for determining a second time at which the current provided to the battery reaches said second predetermined current state during said first finish time period;
   means for terminating the charging of the battery if the current provided to the battery does not reach said second predetermined current state during said first finish time period; and
   means for causing the charging means to continue to charge the battery at an increased charging voltage and a preselected second charging level in the event the battery reached said second predetermined current state during said first finish time period.

6. The battery charging apparatus of claim 5 wherein said charge control circuit includes a counter for timing said initial time period and means for resetting said counter, said counter being reset by said resetting means as a result of the sensed battery current reaching a predetermined current state during said initial time period, and said counter also being reset by said resetting means as a result of a sensed battery current reaching said second predetermined current state during said first finish time period.

7. The battery charging apparatus of claim 5 wheren said charge control circuit includes first and second comparators for determining the first and second times when the current provided to the battery reaches said first and second predetermined current states, respectively.

8. The battery charging apparatus of claim 5 wherin said charge control circuit includes a plurality of bistable elements, a counter, and means for resetting said counter, said bistable elements and counter cooperatively comprising said means for establishing said first finish time period and said second finish time period.

* * * * *

UNITED STATES PATENT AND TRADEMARK OFFICE
CERTIFICATE OF CORRECTION

PATENT NO. : 4,450,401  Page 1 of 3
DATED : May 22, 1984
INVENTOR(S) : Frederic J. Lambert et al.

It is certified that error appears in the above-identified patent and that said Letters Patent is hereby corrected as shown below:

The title page showing the illustrative figure should be deleted to appear as per attached title page.

The single sheet of drawing should be deleted to be replaced with the sheet of drawing as shown on the attached sheet Signed and Sealed this Ninth Day of July 1985

[SEAL]

Attest:

DONALD J. QUIGG

Attesting Officer   Acting Commissioner of Patents and Trademarks

United States Patent [19]

Lambert et al.

[11] 4,450,401
[45] May 22, 1984

[54] CONTROL CIRCUIT FOR AUTOMATIC BATTERY CHARGERS

[75] Inventors: Frederic J. Lambert, Morrisville, Pa.; Donald J. Bosack, Barrington; David K. Johansen, Lake in the Hills, both of Ill.

[73] Assignee: GNB Batteries Inc., Mendota Heights, Minn.

[21] Appl. No.: 396,951

[22] Filed: Jul. 9, 1982

[51] Int. Cl.³ .............................................. H02J 7/00
[52] U.S. Cl. ...................................... 320/22; 320/32; 320/37
[58] Field of Search ......................... 320/20, 21, 22, 30, 320/31, 32, 37, 38, 48

[56] References Cited

U.S. PATENT DOCUMENTS

| | | | |
|---|---|---|---|
| 3,500,167 | 3/1970 | Applegate et al. | 320/14 |
| 3,794,905 | 2/1974 | Long | 320/20 |
| 3,855,516 | 12/1974 | Fairchild | 320/22 |
| 3,864,617 | 2/1975 | Smith et al. | 320/32 |
| 3,912,108 | 10/1975 | Clayton et al. | 320/39 |
| 3,979,658 | 9/1976 | Foster | 320/23 |
| 4,097,792 | 6/1978 | Calaway | 320/23 |
| 4,131,841 | 12/1978 | Bennefeld | 320/23 |
| 4,146,830 | 3/1979 | Foster | 320/23 |
| 4,191,918 | 3/1980 | Nicholls | 320/23 |
| 4,207,513 | 6/1980 | Hess, Jr. | 320/23 |
| 4,209,736 | 6/1980 | Reidenbach | 320/22 |
| 4,213,080 | 7/1980 | Rock | 320/37 |
| 4,217,533 | 8/1980 | Van Beek | 320/23 |
| 4,233,553 | 11/1980 | Prince, Jr. et al. | 320/23 |
| 4,313,078 | 1/1982 | Bilsky | 320/15 |

*Primary Examiner*—William M. Shoop
*Assistant Examiner*—Anita M. Ault
*Attorney, Agent, or Firm*—Augustus J. Hipp

[57] ABSTRACT

An improved battery charger apparatus having a control circuit providing different charging periods which are automatically correlated with the type of battery connected to the charge for charging the connected battery to a preselected full charge state. The apparatus has a charging circuit for charging the battery, a sensing circuit for sensing the state of the battery during charging thereof by the charging circuit and a circuit for determining first and second predetermined reference voltage/current states.

The apparatus causes the charging of the battery at a preselected initial charging level for an initial time period and establishes a first finish time period. The apparatus further determines a first time at which the state of the battery reaches the first predetermined referenced voltage/current state during the initial time period, and causes the charging circuit to continue to charge the battery at a preselected first charging level after the determination of the first time for a first finish time period. The apparatus further establishes a second finish time period and determines a second time at which the state of the battery reaches the second predetermined referenced voltage/current state during the first finish time period. The apparatus terminates charging of the battery if the state of the battery does not reach the second predetermined referenced voltage/current state during the first finish time period, and causes the charging circuit to continue to charge the battery at a preselected second charging level after the determination of the second time for a second finish time period.

8 Claims, 1 Drawing Figure